US006655579B1

(12) United States Patent
Delman et al.

(10) Patent No.: US 6,655,579 B1
(45) Date of Patent: Dec. 2, 2003

(54) MACHINE READABLE CODED FRAME FOR PERSONAL POSTAGE

(75) Inventors: H. Mark Delman, Fairport, NY (US); Paula K. Dumas, Alpharetta, GA (US); David L. Patton, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/558,204

(22) Filed: Apr. 26, 2000

(51) Int. Cl.[7] .............................................. G06F 17/00

(52) U.S. Cl. ...................... 235/375; 235/468; 235/488; 235/494; 283/31

(58) Field of Search ................................ 235/375, 488, 235/494, 468; 283/71

(56) References Cited

U.S. PATENT DOCUMENTS

| | | | | |
|---|---|---|---|---|
| 4,725,718 A | | 2/1988 | Sansone et al. | 235/495 |
| 4,831,555 A | | 5/1989 | Sansone et al. | 364/519 |
| 4,872,706 A | | 10/1989 | Brewen et al. | 283/81 |
| 5,064,222 A | | 11/1991 | Legault | 283/71 |
| 5,471,925 A | | 12/1995 | Heinrich et al. | 101/91 |
| 5,528,339 A | | 6/1996 | Buhr et al. | 355/32 |
| 5,617,519 A | | 4/1997 | Herbert | 395/117 |
| 5,717,597 A | | 2/1998 | Kara | 364/464.18 |
| 5,724,245 A | | 3/1998 | Maher et al. | 364/464.18 |
| 5,778,076 A | | 7/1998 | Kara et al. | 380/51 |
| 5,781,438 A | | 7/1998 | Lee et al. | 364/464.14 |
| 5,801,364 A | | 9/1998 | Kara et al. | 235/375 |
| 5,801,944 A | | 9/1998 | Kara | 364/464.2 |
| 5,812,991 A | | 9/1998 | Kara | 705/410 |
| 5,818,724 A | | 10/1998 | Brewster, Jr. et al. | 364/478.08 |
| 5,819,240 A | | 10/1998 | Kara | 705/408 |
| 5,825,893 A | | 10/1998 | Kara | 380/51 |
| 5,836,617 A | * | 11/1998 | Beaudoin et al. | 283/67 |
| 5,852,813 A | | 12/1998 | Guenther et al. | 705/408 |
| 5,873,605 A | | 2/1999 | Kaplan | 283/71 |
| 5,912,682 A | * | 6/1999 | Parkos | 347/40 |
| 5,923,406 A | | 7/1999 | Brasington et al. | 355/40 |
| 5,978,781 A | | 11/1999 | Sansone | 705/408 |
| 5,987,441 A | | 11/1999 | Lee et al. | 705/401 |
| 5,991,409 A | | 11/1999 | Windel et al. | 380/23 |
| 6,009,416 A | * | 12/1999 | Pintsov | 705/410 |
| 6,013,878 A | * | 1/2000 | Schwartz et al. | 177/25.13 |
| 6,045,206 A | * | 4/2000 | Igval | 347/2 |
| 6,079,327 A | * | 6/2000 | Sarada | 101/93.11 |
| 6,209,923 B1 | * | 4/2001 | Thaxton et al. | 283/72 |
| 6,240,196 B1 | * | 5/2001 | Fischer et al. | 382/100 |

FOREIGN PATENT DOCUMENTS

| | | |
|---|---|---|
| CA | 2177368 | 6/1995 |
| CA | 2239382 | 6/1997 |
| CA | 2241778 | 12/1998 |
| CA | 2181349 | 2/1999 |
| CA | 2344472 | 5/2000 |

OTHER PUBLICATIONS

Thomas Antognini, Ph.D., and Walter Antoginini, J.D.,; A Flexibly Configurable 2D Bar Code; pp. 1–29. Month and year missing.

* cited by examiner

*Primary Examiner*—Michael G. Lee
*Assistant Examiner*—Seung H Lee
(74) *Attorney, Agent, or Firm*—Frank Pincelli

(57) ABSTRACT

A personal postal product and a system for producing same. The postal product includes a personal image area for receiving a personal image and an official postal image area having a machine-readable code. The machine-readable code is configured so as to extend around at least a portion of the personalized image area. The code may be colored and coordinated with a color present in the personal image The personal image area and official postal image have may a variety of shapes. The system includes a computer for processing image data, a data entry device for entering a digital and a printer for producing the postal indicia.

53 Claims, 11 Drawing Sheets

MACHINE READABLE CODED FRAME FOR PERSONAL POSTAGE

FIELD OF THE INVENTION

This invention relates to an article and system used for creating and printing of customized official postage as an aesthetic border for a personal postal product.

BACKGROUND OF THE INVENTION

U.S. Pat. No. 4,725,718 discloses using indicia in the form of a code for identifying the postage amount, the mail address and authenticity of the postage. U.S. Pat. No. 4,831,555, discloses a postage applying system where the device used for printing of postage and the accounting unit are separated from one another by an unsecured link and the authenticity of the postage is insured by encryption. Both of these patents disclose printing of postage using a device such as an off the shelf printer. U.S. Pat. No. 5,801,944 discloses a system for printing a postage meter stamp, including a desired postage amount and personalized postage indicia onto a label or directly onto a document. The processing system that formats and prints the document, calculates the appropriate postage for the document, encrypts selected information into machine readable format, and prints the appropriate postage for that document at the same time the document is being printed. The processing system interacts with the customer to generate personal stamp indicia and prints the information onto the outside of a mailing envelope. U.S. Pat. No. 5,819,240 discloses printing a postage meter stamp including the postage amount and a personalized postage indicia onto a piece of mail. The personalized postage indicia can be created by the user or selected from a list of graphics supplied by the Post Office and placed on a postal storage device. Also disclosed is the use of two compatible computer programs. One program runs on a computer at the Post Office and a second program that runs on the user's computer.

These previously mentioned patents disclose a method which allows a customer to print postage using their computer and an off the shelf printer at a location remote from the post office. When the postage is printed using an off the shelf printer and not a secured postage meter, an encryption scheme as described in the patents previously set forth is used. In each of the cases described above, the postage printed is akin to postage printed using a postage meter. The postage indicia are applied using a single color of ink.

There are several problems with the systems and methods disclosed. The first is that the postage printed is limited to one or two colors. Again as mentioned above these indicia are typically very rudimentary and are no more than line drawings. Another problem is the personalized indicia are typically printed in close proximity to any customized postal indicia or personalized image associated with the postage. The encrypted postage is not actually part of the personalized image itself. Because the postage is encrypted using a form of one or two-dimensional bar code, the encrypted postage detracts from the aesteteic appearance of any personalized indicia or image. One of the characteristics of encrypted official postage indicia is the relationship between the official postage indicia and any personal or custom indicia printed on an article of mail. An example of an article of mail is an envelope, post card, etc.

The present invention provides a method and system for customizing an official postal product that solves many of the problems of the prior art. The method and system also provides high quality images on official postal products having the required quality, characteristics, and content standards.

SUMMARY OF THE INVENTION

In accordance with one aspect of the present invention there is provided a personal postal product comprised of a personal image area for receiving a personal image and an official postal image area having a machine-readable code. The machine-readable code is configured so as to extend substantially around the personalized image area.

Another aspect of the present invention is provided a personal postage product wherein the official postal image area is printed using a color. The color of the code may be coordinated with a color present in the personal image or be in direct contrast to at least one of the colors in personal image.

In yet a further aspect of the present invention there is provided a personal postal product comprised of a personal image area having a substantially polygonal shape, and the official postal image area comprised of a machine-readable code configured to extend substantially along at least two sides of the polygon. The personal image area also may have a generally ellipsoid shape where the official postal image area comprised of a machine readable code is configured to extend along at least a portion of the periphery of said ellipsoid shape.

In still another aspect of the present invention a system for producing postal indicia comprised of a computer for processing image data. A data entry means for entering a digital image, which is to be incorporated into part of the postal indicia. A printer for producing the postal indicia, the postal indicia is comprised of a personal image area for receiving a personal image and an official postal image area. The official postage image area is comprised of a machine-readable code configured to extend substantially around the postal image area.

In another aspect of the present invention there is provided a personal postal product comprised of a personal image area for receiving a personal image and an official postal image area having a machine-readable code. The machine-readable code is within or mixed with the personalized image area.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
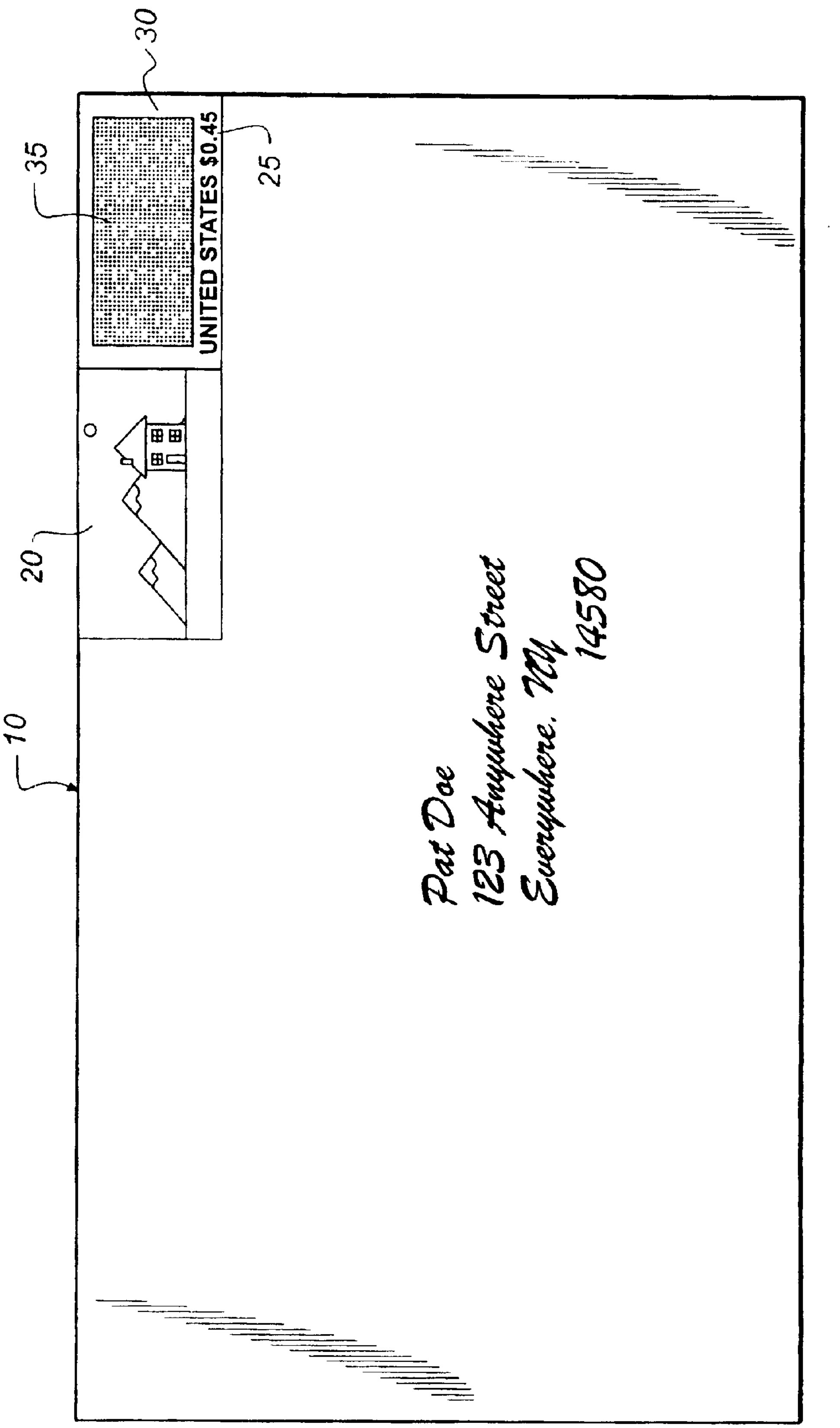
FIG. 1 (PRIOR ART)
FIG. 1 is a plan view of a prior art envelope printed with a personal image and an official postal image comprised of a machine-readable code.

Referring now to FIG. 1, a plan view of an envelope 10 printed with a personal image 20 and an official postal image 30 in accordance with the prior art. The official postal image 30 is comprised of a eye-readable information such as the denomination of the stamp 25 and a machine-readable code 35 printed in a format that is currently known in the art. One example of the machine-readable code is PaperDisk™ developed by Cobblestone Software, Inc. of Lexington, Mass. PaperDisk™ is a flexibly configurable 2D bar code. PaperDisk™ is described in a white paper delivered to the Information Based Indicia Program Technology Symposium, sponsored by the United States Postal Service, Nov. 25–26, 1996 by Thomas Antognini, Ph.D., Cobblestone Software, Inc. and Walter Antognini, J. D., Cobblestone Software, Inc. and Pace University and is hereby incorporated by reference. The machine-readable code 35 is printed in a block format next to the personal image area 20 or some other type of customized indicia. An example of a customized indicia maybe a logo representing a business, advertising message, etc. In other instances the complete code 35 is printed above or below the personal image area 20. The machine-readable code 35 as described above is a two dimensional bar code. The standard bar code currently used by the Post Office is POSTNET ZIP+4 described in Postal Service Publication number 67. An example of the type of code used by the Post Office is the Universal Product Code (UPC) seen on many products. The advantage of the two dimensional bar code over the standard bar code is the amount of data that can be encrypted. Because of the amount of additional information required to print an official postal image 30 using a personal computer and off the shelf printer at a location remote from the post office the two dimensional bar code is currently preferred. However, it is to be understood that any suitable machine readable code may be used that is currently available or may become available, for example but not by way of limitation, a bar code.

Figure 2:
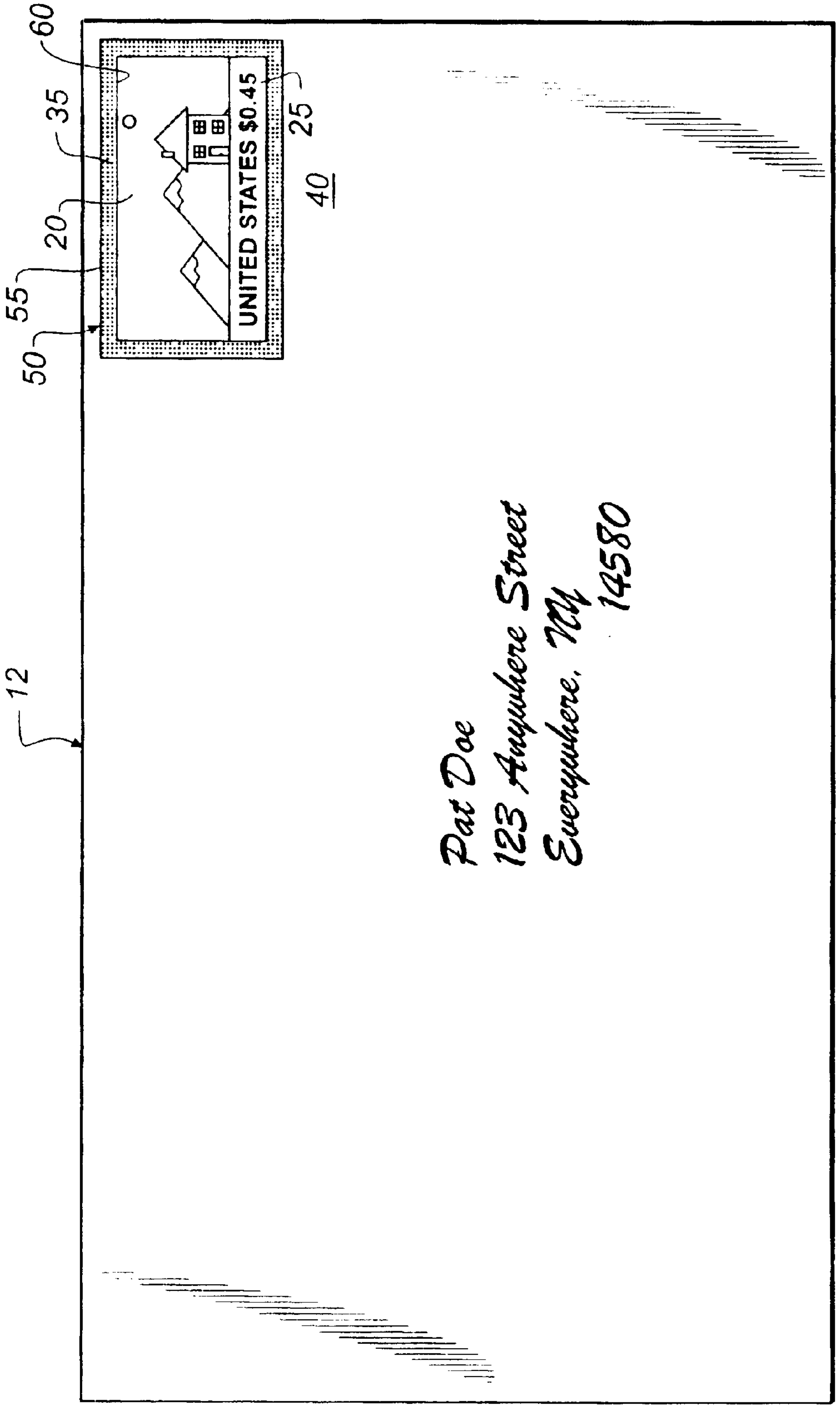
FIG. 2 is a plan view of a postal product printed with personal image and an official postal image comprised of a machine-readable code printed as a frame around the personal image made in accordance with the present invention.

Referring now to FIG. 2, FIG. 2 is a plan view of a postal product 12printed with a postage area 40, made in accordance with the present invention. In the embodiment illustrated the postal product is an envelope. However, the postal product 12 may be a postcard, stamp, label or any other item now used for retaining official postage. The postage area 40 comprises an official area 50 bounded on the outer circumference by periphery 55 and on the inner circumference by periphery 60 and a personal image area 20 bounded on the outer circumference by periphery 55. The official section 50 is comprised of an official postal image 30 comprising a machine-readable code 35 as described with respect to FIG. 1. The user using any type of digital image file, graphic, text or any combination of the three can create the personal image area 20. In FIG. 2 the official postal area 50 has been configured as a border or frame printed around the personal image area 20.

Figure 3A:
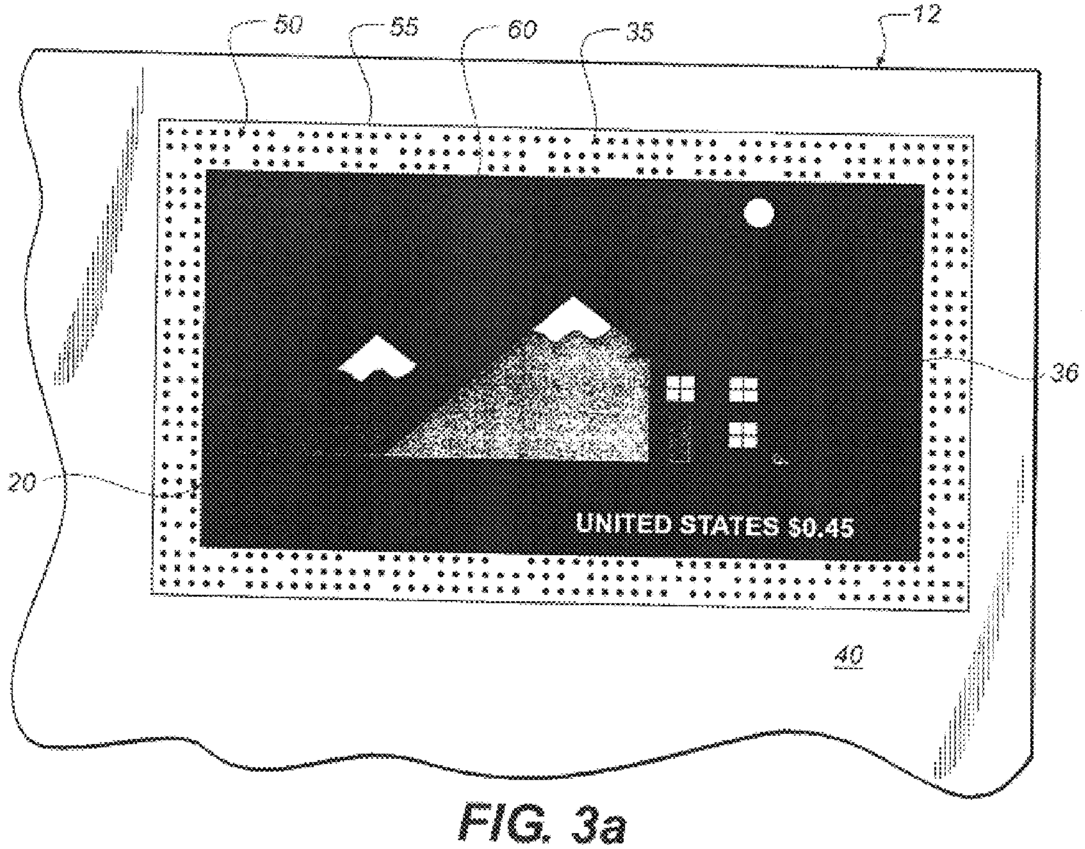
FIG. 3*a* is an enlarged partial color view of a postal product having the personal image with the official postal image of FIG. 2.

Referring to FIG. 3*a*, FIG. 3*a* is an enlarged partial color view of a postal product 12 having the postal image 40 shown in FIG. 2. FIG. 3*a* shows the machine-readable code 35 of the official postal area 50 printed in a colored ink as opposed to the standard black ink currently used. In the embodiment illustrated the color of postal area 50 is matched to one of the colors present in personal image area 20. Alternatively the color of the code 35 may be complimentary, contrasting or as desired. For example the color in the sky 36 matches the color of the code 35. The color used to print the machine-readable code 35 may be a complimentary hue or shade of one the colors present in the personal image area 20. The color for code 35 can be automatically determined by an algorithm that identifies an appropriate color for code 35 from the colors present in the personal image area 20. This is accomplished by determining the colorimetric values of the image pixels of the digital file of the personal image in the image area 20 using standard colorimetric techniques. Colorimetry is the measurement of color. A set of colorimetric parameters for an object, based on measured colorimetric parameters, can quantify the color of the object as it appears to the average observer under a specific set of viewing conditions. Techniques described in U.S. Pat. No. 5,528,339 can be used to identify the colorimetric values of the image suitable for use with the present invention. Using these techniques, colors can be determine automatically for printing the code 35 which can be complimentary or contrasting as desired.

Figure 3B:
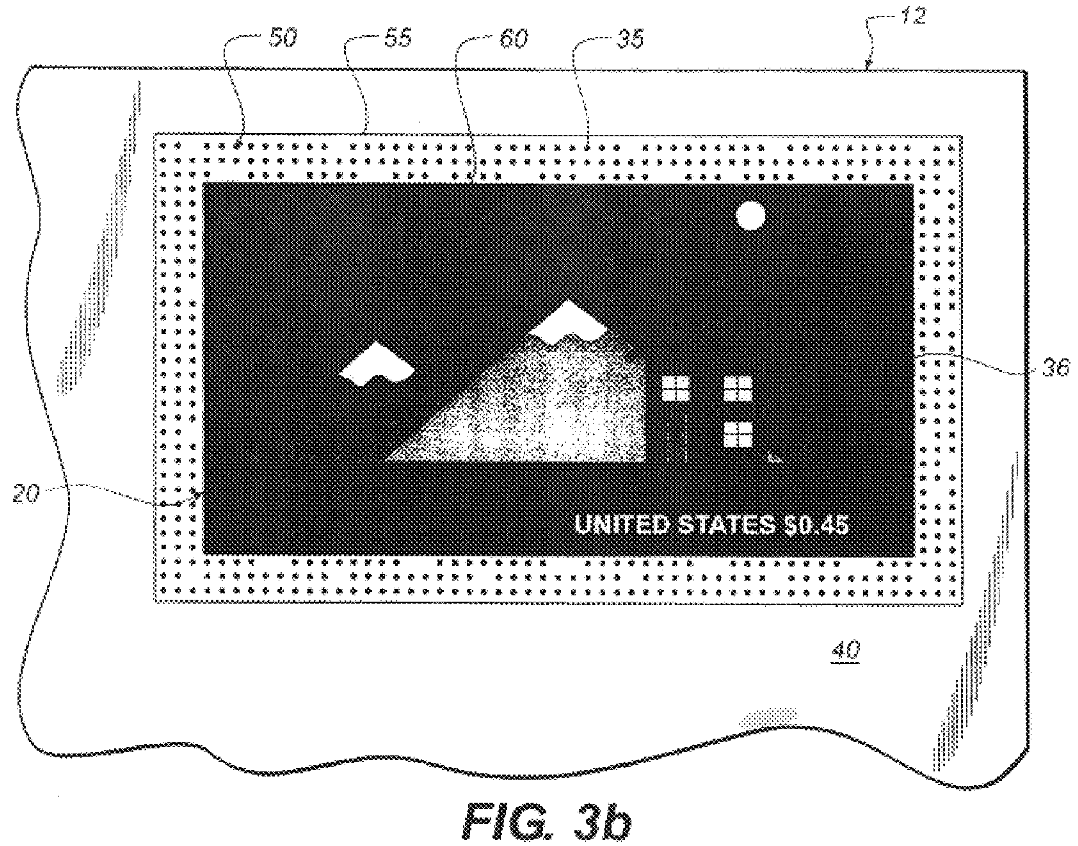
FIG. 3*b* is a view (also in color) similar to FIG. 3*a* effectively a different color scheme.

Referring to FIG. 3*b*, FIG. 3*b* is an enlarged partial color view of a postal product 12 having the postal image 40 shown in FIG. 2. FIG. 3*b* shows the machine-readable code 35 of the official postal area 50 printed in a color contrasting with one of the colors present in the personal image area 20.

For example the color in the sky 36 contrasts with the color of the code 35.

Figure 4A:
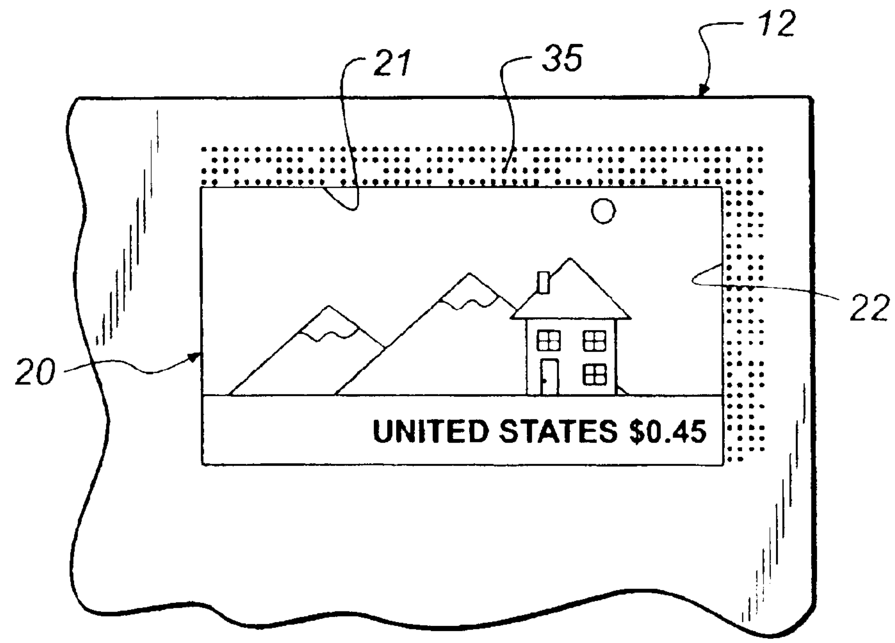
FIG. 4*a* is an enlarged partial view of a postal product having a personal image with an official postal image machine-readable code printed adjacent two sides of the periphery also made in accordance with the present invention.

While in the present embodiment, the code 35 is shown substantially surrounding the periphery of the image; the present invention is not so limited. FIG. 4*a* is a enlarged partial view of a postal product 12 having the personal image area 20 with the machine-readable code 35 of the official postal area 50 shown in FIG. 2, printed along two sides 21 and 22 of the of the personal image area 20.

Figure 4B:
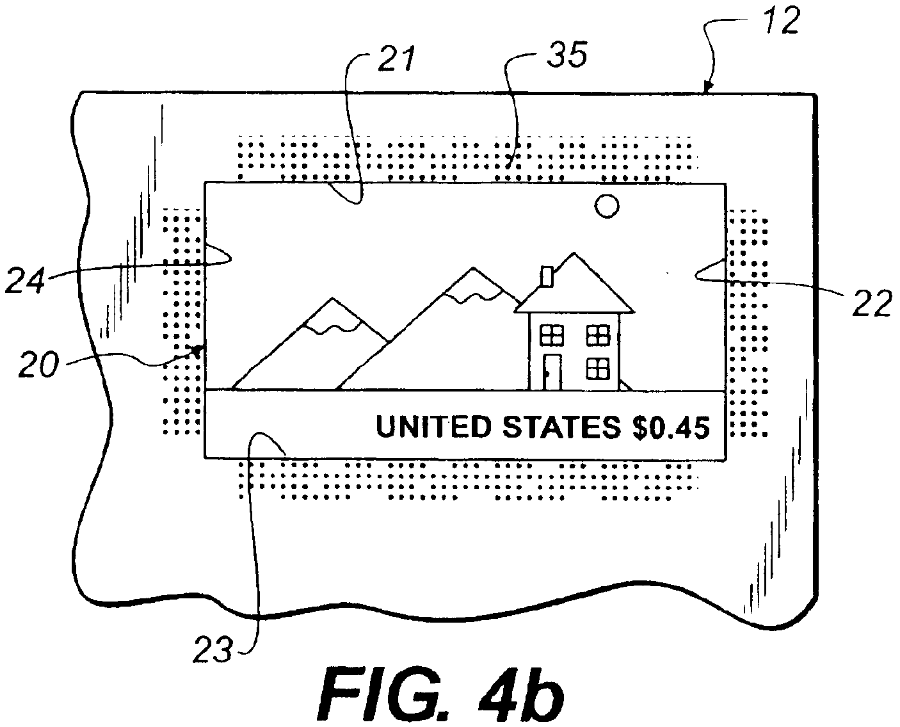
FIG. 4*b* is an enlarged partial view of a postal product having a personal image with an official postal image machine-readable code printed on the partial length of each of the four sides of the periphery also made in accordance with the present invention.

FIG. 4*b* is a plan view of a postal product 12 having the personal image area 20 with the machine-readable code 35 of the official postal area 50 shown in FIG. 2. The machine-readable code 35 is printed along the partial length of four sides 21, 22, 23, and 24 of the of the personal image area 20.

The machine-readable code 35 as shown in both FIGS. 4*a* and 4*b* may be printed along any of the sides 21, 22, 23, or 24 or along any combination of sides or any portion of any one side.

Figure 5A:
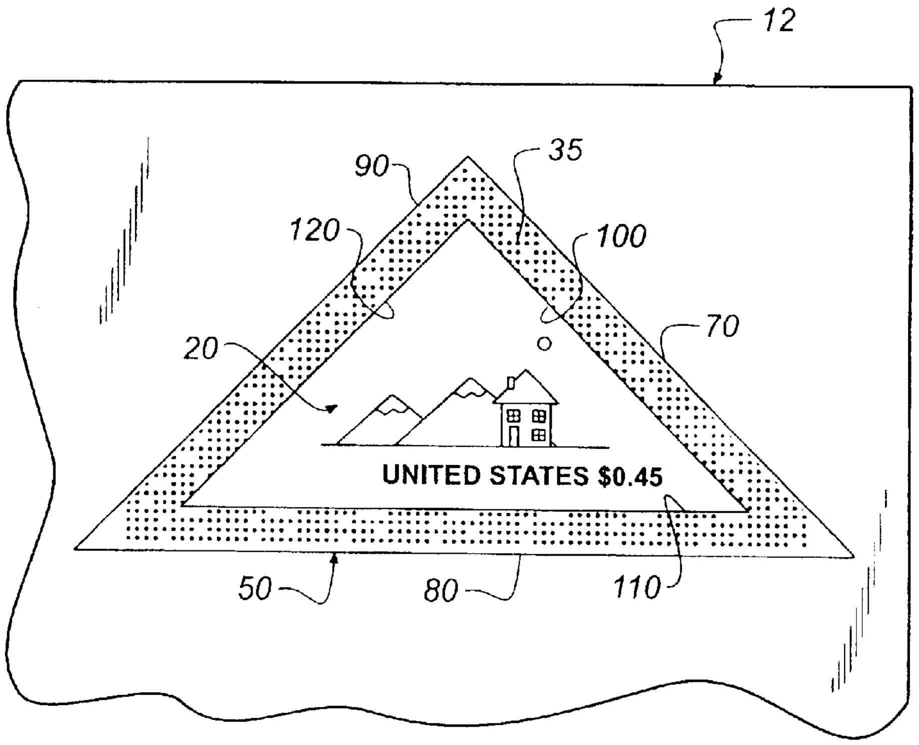
FIGS. 5*a* and 5*b* are an enlarged partial view of a postal product having a personal image and an official postal image printed in a triangular format also made in accordance with the present invention.
Figure 5B:
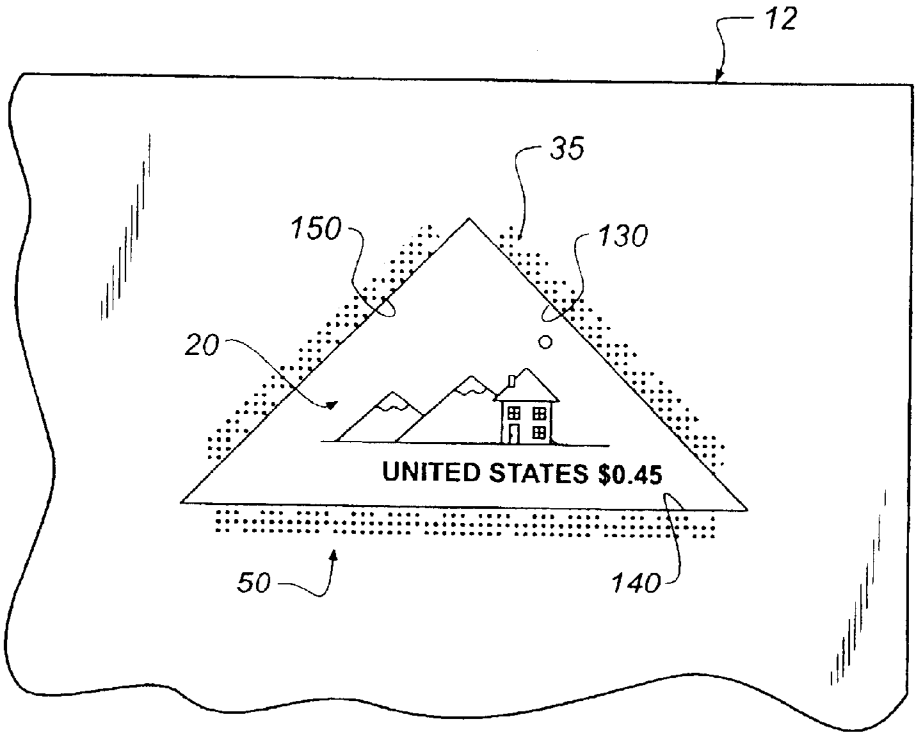

FIGS. 5*a* and 5*b* are plan views of a postal product 12 having the personal image 20 and the official postal area 50 printed in a triangular format.

Referring to FIG. 5*a*, FIG. 5*a* shows the machine-readable code 35 of the official area 50 bounded on the outer border by lines 70, 80, and 90 and on the inner border by lines 100, 110, and 120. The personal image area 20 is bounded on the outer border by lines 100, 110, and 120.

Referring to FIG. 5*b*, FIG. 5*b* shows the machine-readable code 35 of the official postal area 50 printed partially along the three sides 130, 140 and 150 of the personal image area 20. The machine-readable code 35 as shown in both FIGS. 5*a* and 5*b* may be printed along any of the sides 100, 110, 120, 130, 140 and 150 respectively or along any combination of sides or any portion of any one side.

Figure 6A:
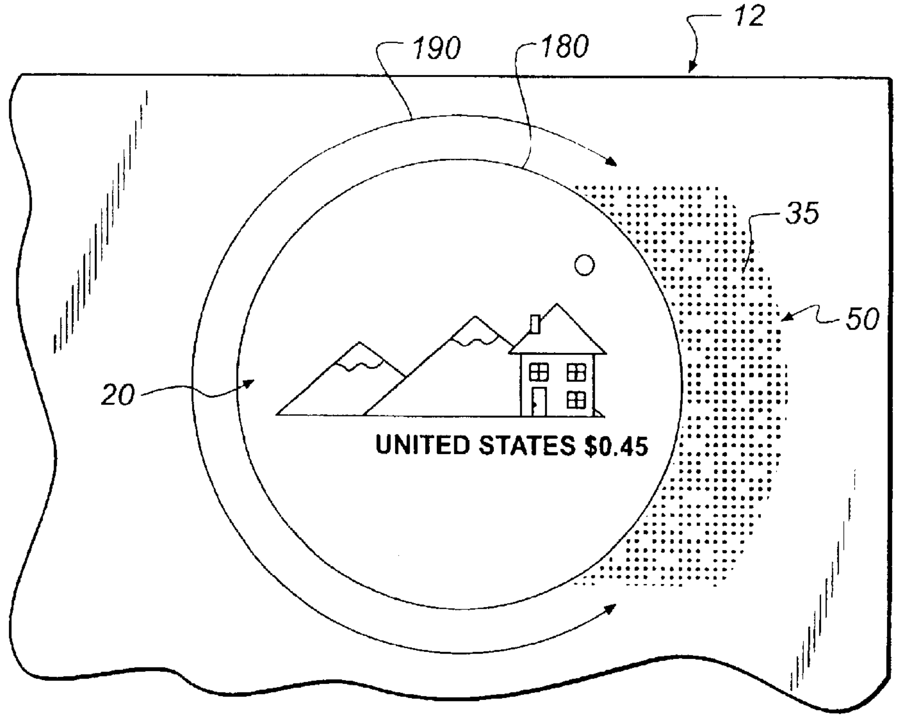
FIG. 6*a* is an enlarged partial view of a postal product having a personal image and an official postal image comprised of a machine-readable code printed in a curved format also made in accordance with the present invention.

FIGS. 6*a* is a plan view of the personal image 20 and the official postal area 50 comprised of a machine-readable code 35 printed in a curved format on a postal product 12.

Referring to FIG. 6*a*, shows the machine-readable code 35 of the official postal area 50 printed along a portion of the periphery of the circular personal image area 20 indicated by line 180. The portion of the periphery of the circular personal image area 20 where no code is printed is indicated by line 190. The outer border of the personal image area 20 is bounded by line 180.

Figure 6B:
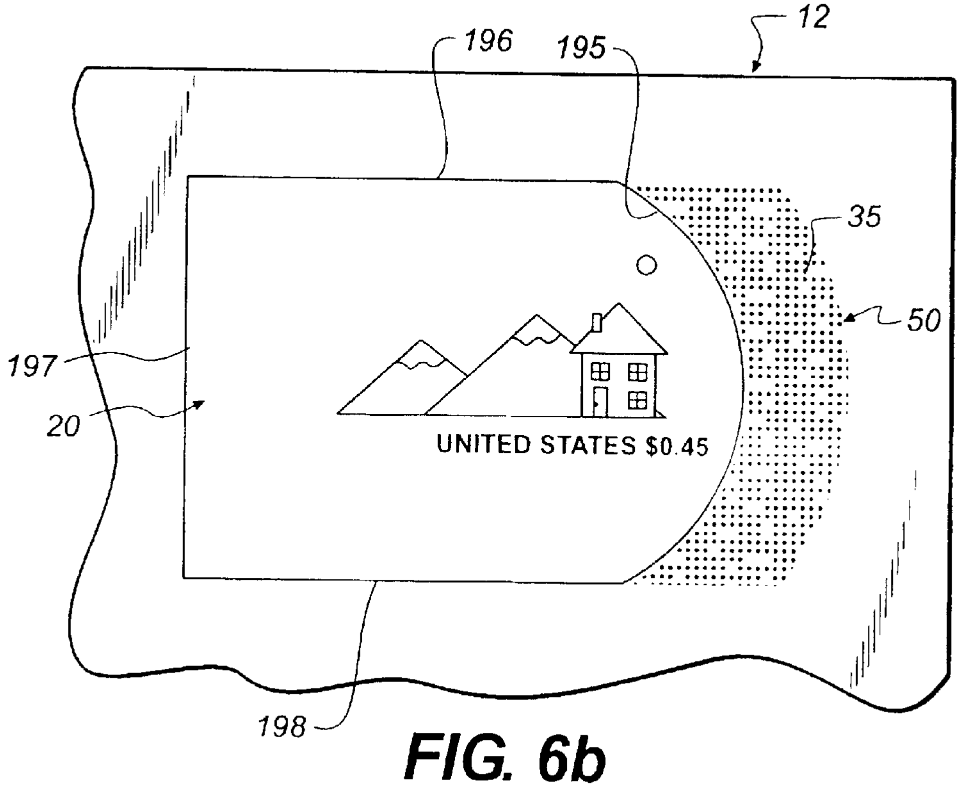
FIGS. 6*b* is an enlarged partial view of a postal product having a personal image and an official postal image comprised of a machine-readable code printed in a curved and straight sided format also made in accordance with the present invention.

Referring to FIG. 6*b*, FIG. 6*b* is an enlarged partial view of a postal product 12 having the personal image area 20 and machine-readable code 35 printed in a curved and straight-sided format. FIG. 6*b* shows the machine-readable code 35 printed along the curved portion indicated by line 195 of the outer periphery of the personal image area 20 leaving the remaining portion blank. The machine-readable code 35 may be printed along any of the sides 195, 196, 197 and 198 or along any combination of sides or any portion of any one side.

Figure 7:
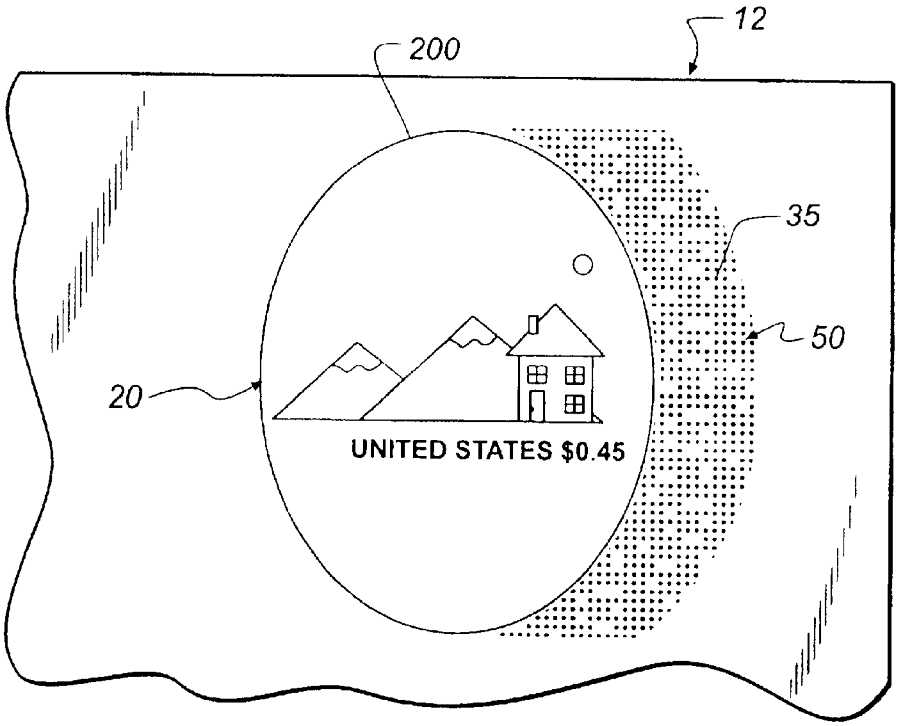
FIG. 7 is an enlarged partial view of a postal product having a personal image and an official postal image comprised of a machine-readable code printed in an elliptical format also made in accordance with the present invention.

Now referring to FIG. 7, FIG. 7 is a plan view of a personal image area 20 and the official postal area 50 printed in an elliptical format on a postal product 12. FIG. 7 illustrates the machine-readable code 35 of the official postal area 50 printed along a portion of the periphery indicated by line 200. The machine-readable code 35 may be printed along any portion of the outer periphery of the personal image area 20 leaving the remaining portion of the periphery blank.

Figure 8:
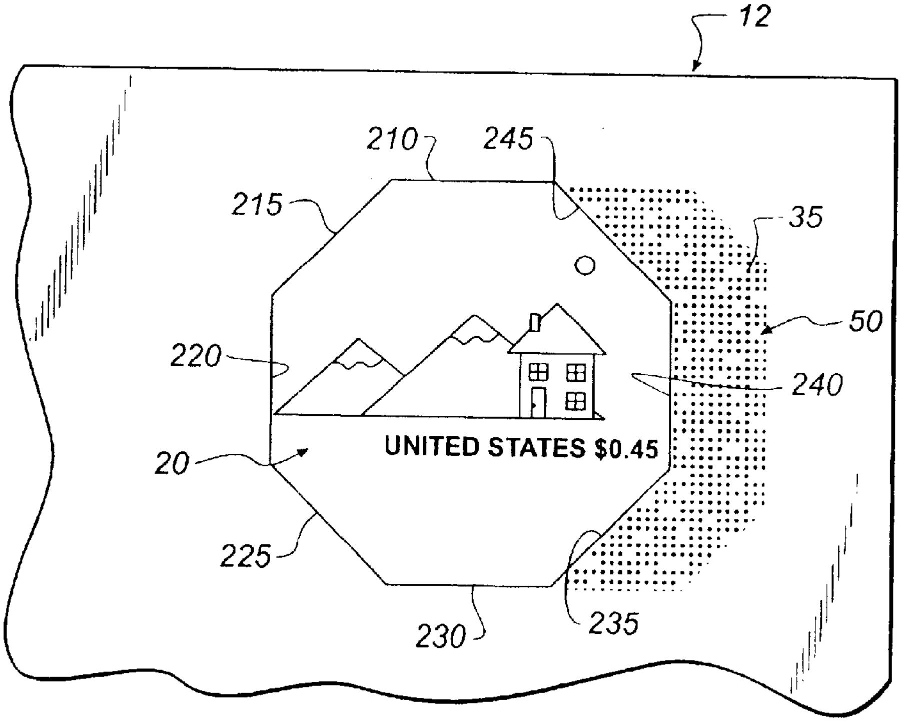
FIG. 8 is an enlarged partial view of a postal product having a personal image and an official postal image comprised of a machine-readable code printed in a octagon format also made in accordance with the present invention.

Now referring to FIG. 8, FIG. 8 is a plan view of a personal image area 20 and the official postal area 50 printed in an octagon format on a postal product 12 indicated by lines 210, 215, 220, 225, 230, 235, 240, and 245. FIG. 8 illustrates the machine-readable code 35 of the official postal area 50 printed along a portion of the periphery indicated by lines 235, 240, and 245. The machine-readable code 35 may be printed along any of the sides or along any combination of sides or any portion of any one side.

Figure 9A:
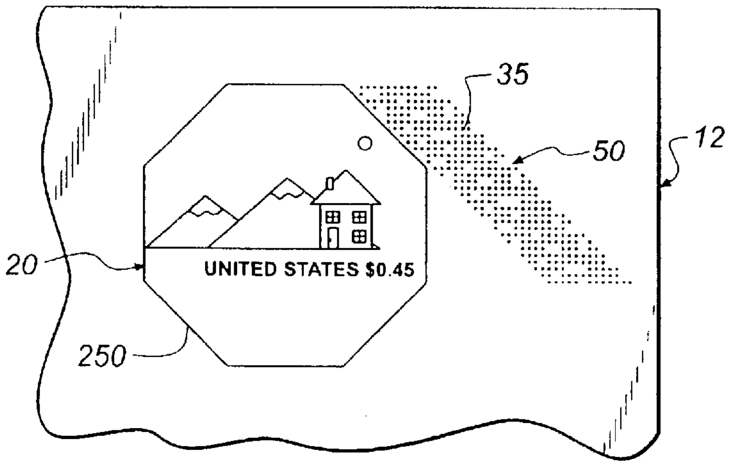
FIGS. 9*a*, 9*b*, and 9*c* are enlarged partial views of a postal product illustrating a variety of shapes in which the machine-readable code may be printed in relationship to the personal image area also made in accordance with the present invention.
Figure 9B:
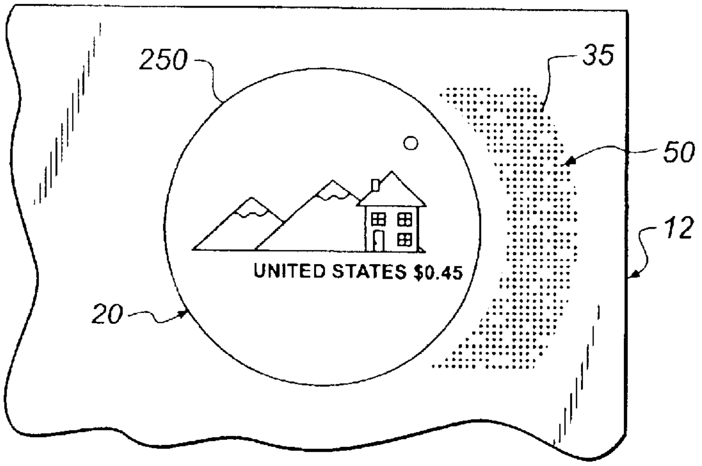
Figure 9C:
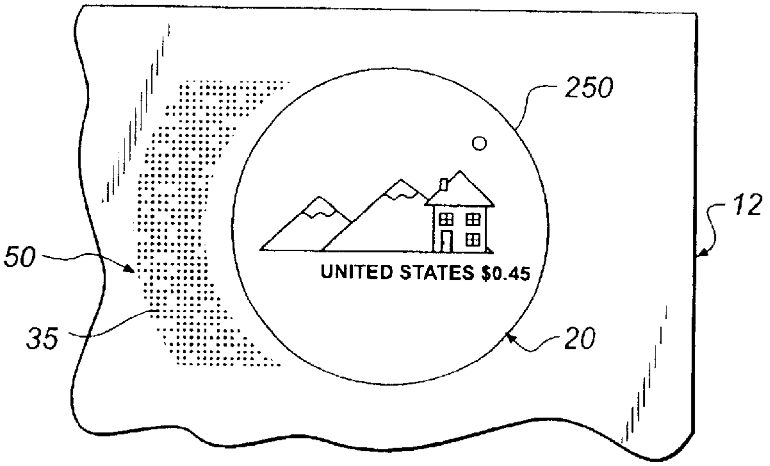

As shown in FIGS. 9*a*, 9*b*, and 9*c* it is to be understood that the personal image area 20 may take any shape/configuration desired and the machine-readable code 35 may take a variety of other shapes and configurations, many of which are not shown. Additionally while the machine-readable code 35 is shown being adjacent to the periphery 250, the machine-readable code 35 may be partially or total spaced from the personal image area 20 so as to provide various aesthetically pleasing designs. Thus the machine-readable code 35 may take a variety of shapes correspondingly or complimentary to that shape of the personal image area.

Figure 10A:
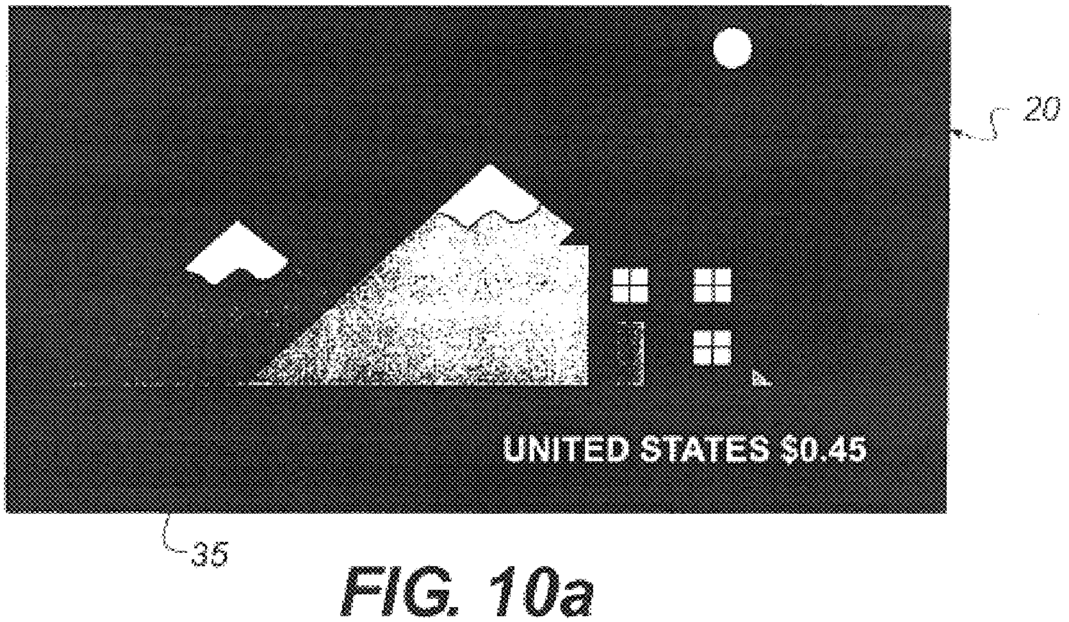
FIGS. 10*a* and 10*b* are enlarged partial views of a postal product having a personal image and an official postal image printed in an alternate format also made in accordance with the present invention.
Figure 10B:
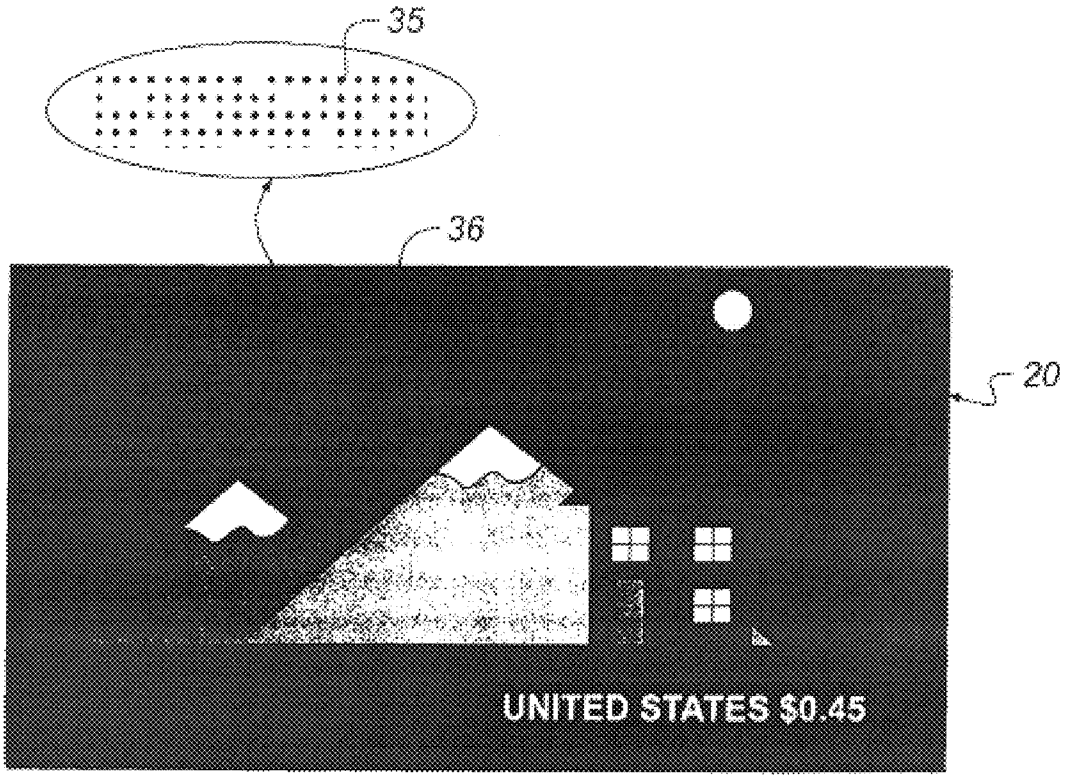

In the embodiments discussed above the code 35 is place about the periphery of the personal image area 20. However, the present invention is not so limited. If desired the official postal area 50 may be within the personal image area 20 or intermixed there with as illustrated by FIGS. 10*a* and 10*b*. FIG. 10*a* illustrates the code 35 place within the personal image area 20. FIG. 10*b* illustrates that the code 35 is intermixed with the sky 36 of the personal image area 20. In this embodiment, the code is placed in a generally non-interesting area. This may be for example an area where the tone and/or color scale is generally uniform. These characteristics can be automatically obtaining by digital scanning of the personal image to be placed in image area 20 and analyzing of the scanned image. When printing the code 35 in the personal image area 20, the code 35 may be printed using an ink, pigment or dye which is not visible on normal lighting conditions. Such inks may be visible under UV or infra red light. An example of such an ink is sold by the Eastman Chemical Company under the trade name N.I.R.F. (near-infrared fluorophore) inks sells appropriate suitable ink for placement of the information.

Figure 11:
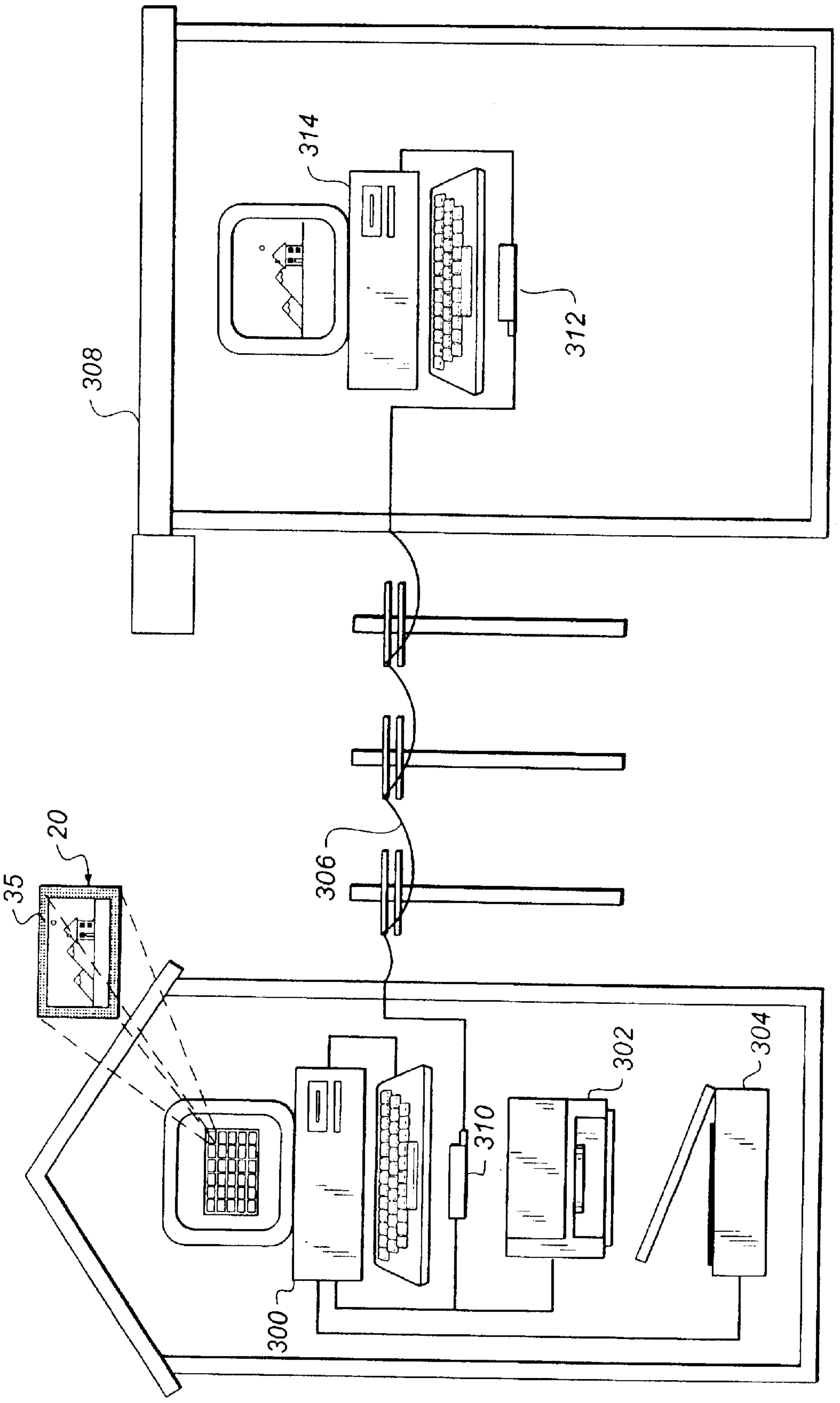
FIG. 11 is schematic diagram of a system made in accordance with the present invention for making postal products in accordance with the present invention.

Referring to FIG. 11 there is illustrated a system for practicing of the present invention. In the embodiment illustrated a computer 300, such as personal computer, connected to a printer 302. The printer 302 may be a postage meter or franking device that keeps track of the amount of postage being printed and subtracts the monetary amount of the printed postage from an amount stored in the postage meter. In another example the postage meter is remote from the accounting agency and communicates with the accounting agency via a data transmission system such as the Internet. In another example postage meter or franking device may be connected to an accounting device that receives the monetary amount of postage from the accounting agency and store it in it's own memory which is addressable by the postage meter. An optional scanner 304, or other data entry means, may be provided for obtaining of a personal image for placement in the personal image area 20. The computer 300 has appropriate communication software and hardware that allows the computer 300 to be electronically connected to other computers, data bases, etc. via a modem 310 over a communication network 306. In the embodiment illustrated the network 306 may include the internet. The personal images may be obtained from any source, for example electronically from stored image files or over a communication network such as the internet. Also in the embodiment illustrated the computer 300 is shown in communication via a modem 312 and computer 314 with an authorizing authority 308 capable of authorizing the printing of official postage. This may be the official governmental postal authority 308 or some other independent business that has been authorized. The authorizing authority 308 in addition to authorizing amounts of postage to be printed, may also provide coded information that would be placed in code 35. This coded information can later be read to confirm the amount, the individual or business that has been authorized to print the official postal indicia, and authenticity of the official postal indicia. It is of course understood that any other appropriate information may be encoded within code 35. The use of a two-dimensional code allows the providing of relatively large amounts of related and/or independent information.

The invention has been described in detail with particular reference to certain preferred embodiments thereof, but it will be understood that variations and modifications can be effected within the scope of the invention, the present invention being deferred by the following claims.

PARTS LIST

10 Envelope
12 Postal product
20 Personal image area
21 Side
22 Side
23 Side
24 Side
25 Eye-readable official postage
30 Official postal image
35 Machine-readable code
36 sky
40 Postage area
50 Official area
55 Outer periphery
60 Inner periphery
70 Outer border lines
80 Outer border lines
90 Outer border lines
100 inner border lines
110 inner border lines
120 inner border lines
130 side
140 side
150 side
180 line
190 line
195 line
196 line
197 line
198 line
200 line
210 line
220 line
225 line
230 line
235 line
240 line
245 line
250 periphery
300 computer
302 printer
304 scanner
306 network
308 authorizing authority
310 modem
312 modem
314 computer

What is claimed is:

1. A personal postal product comprising:

a personal image area for receiving a personal image; and an official postal image area;

said official postal area having a machine readable code and configured so as to extend substantially around said personalized image area.

2. A personal postage product according to claim 1 wherein said official postal image area having a color other than black.

3. A personal postage product according to claim 1 wherein said official postal image area having a color which is coordinated with said personal image.

4. A personal postal product according to claim 1 wherein said official postal image area has a color which corresponds to at least one of the colors in said personal image.

5. A personal postal product according to claim 1 wherein said official postal image area has a color which is in contrast to at least one of said colors in said personal image.

6. A personal postal product according to claim 1 wherein said machine readable code comprises a two dimensional readable code.

7. A personal postal product according to claim 1 wherein said postal product comprises a stamp.

8. A personal postal product according to claim 1 wherein said postal product comprises an envelope.

9. A personal postal product according to claim 1 wherein said postal product comprises a post card.

10. A personal postal product according to claim 1 wherein said postal product comprises a label.

11. A personal postal product according to claim 1 wherein said personal image area has a generally rectangular shape.

12. A personal postal product according to claim 1 wherein said personal image area has a generally circular shape.

13. A personal postal product according to claim 1 wherein said personal image area has a generally triangular shape.

14. A personal postal product according to claim 1 wherein said personal image area generally circular in shape.

15. A personal postal product according to claim 1 wherein said personal image area generally ellipse in shape.

16. A personal postal product according to claim 1 wherein said personal image area has a generally triangular shape.

17. A personal postal product comprising:

a personal image area for receiving personal image; and an official postal image area;

said official postal area having a machine readable code and configured so as to extend along at least a portion of said personalized image area, said machine readable code having a color other than black.

18. A personal postage product according to claim 17 wherein said official postal image area has a color which is coordinated with said personal image.

19. A personal postal product according to claim 17 wherein said official postal image area has a color which corresponds to at least one of the colors in said personal image.

20. A personal postal product according to claim 17 wherein said official postal image area has a color which is in contrast to at least one of said colors in said personal image.

21. A personal postal product according to claim 17 wherein said machine readable code comprises a two dimensional readable code.

22. A personal postal product according to claim 17 wherein said postal product comprises a stamp.

23. A personal postal product according to claim 17 wherein said postal product comprises an envelope.

24. A personal postal product according to claim 17 wherein said postal product comprises a post card.

25. A personal postal product according to claim 17 wherein said postal product comprises a label.

26. A personal postal product according to claim 17 wherein said personal image area has a generally rectangular shape.

27. A personal postal product according to claim 17 wherein said personal image area has a generally circular shape.

28. A personal postal product according to claim 17 wherein said personal image area generally circular in shape.

29. A personal postal product according to claim 17 wherein said personal image area generally ellipse in shape.

30. A personal postal product comprising:

a personal image area for receiving a personal image, said personal image area having a substantially polygonal shape;

an official postal image area, said official postal image area comprising a machine readable code and configured so as to extend substantially along at least two sides of said polygon.

31. A personal postage product according to claim 30 wherein said official postal image area having a color other than black.

32. A personal postage product according to claim 30 wherein said official postal image area having a color which is coordinated with said personal image.

33. A personal postal product according to claim 30 wherein said official postal image area has a color which corresponds to at least one of the colors in said personal image.

34. A personal postal product according to claim 30 wherein said official postal image area has a color which is in contrast to at least one of said colors in said personal image.

35. A personal postal product according to claim 30 wherein said machine readable code comprises a two dimensional readable code.

36. A personal postal product comprising:

a personal image area for receiving a personal image, said personal image area having a generally ellipsoid shape;

an official postal image area, said official postal image area comprising a machine readable code configured so as to extend along at least a portion of the periphery of said ellipsoid shape.

37. A personal postage product according to claim 36 wherein said official postal image area having a color other than black.

38. A personal postage product according to claim 36 wherein said official postal image area having a color which is coordinated with said personal image.

39. A personal postal product according to claim 36 wherein said official postal image area has a color which corresponds to at least one of the colors in said personal image.

40. A personal postal product according to claim 36 wherein said official postal image area has a color which is in contrast to at least one of said colors in said personal image.

41. A personal postal product according to claim 36 wherein said machine readable code comprises a two dimensional readable code.

42. A system for producing a postal indicia, comprising:

a computer for processing image data;

a data entry means for entering a digital image which is to be incorporated into a part of said postal indicia; and a printer for producing said postal indicia, said postal indicia comprising a personal image area for receiving a personal image and an official postal image area, said official image postage image area comprising a machine readable code configured so as to extend substantially around said postal image area.

43. A system according to claim 42 wherein said computer obtains authorization to said print official image area.

44. A system according to claim 42 wherein said postal indicia is printed on one of the following:

a stamp;

an envelope;

a label;

a postcard.

45. A system according to claim 42 wherein said printer comprises a postal meter.

46. A system according to claim 45 wherein said printer also keeps track of the amount of postage printed.

47. A system according to claim 42 wherein said postal indicia includes an amount of official postage.

48. A system according to claim 47 wherein said amount is placed in said personal image area and said official image postal area.

49. A system for producing a postal indicia, comprising:

a computer for processing image data;

a data entry means for entering a digital image which is to be incorporated into said part of said postal indicia; and a printer for producing said postal indicia, said postal indicia comprising a personal image area for receiving a personal image and an official postal image area, said official image postage image area comprising a machine readable code configured so as to extend substantially around said postal image area.

50. A system according to claim 49 wherein said printer also keeps track of the amount of postage printed.

51. A personal postal product comprising:

a personal image area for receiving personal image; and an official postal image area;

said official postal area having a machine readable code and configured so as to be intermixed or within said personalized image area.

52. A personal postal product according to claim 51 wherein said machine readable code is written in an ink not normally visible under normal viewing conditions.

53. A system according to claim 51 wherein said printer comprises a postal meter.

* * * * *